3,578,423
PROCESS FOR CATALYTICALLY SPLITTING ISO-
BUTYRALDEHYDE TO PRODUCE CARBON
MONOXIDE AND HYDROGEN
Jurgen Falbe, Dinslaken, and Heinz-Dieter Hahn, Ober-
hausen-Sterkrade-Nord, Germany, assignors to Ruhr-
chemie A.G.
No Drawing. Filed Apr. 14, 1969, Ser. No. 816,108
Claims priority, application Germany, Apr. 20, 1968,
P 17 67 281.0
Int. Cl. C01b 2/14
U.S. Cl. 48—197
11 Claims

ABSTRACT OF THE DISCLOSURE

Process for catalytically splitting isobutyraldehyde with formation of a gas mixture consisting essentially in carbon monoxide and hydrogen which comprises contacting isobutyraldehyde and water vapor in amount of at least 3 moles water vapor per g-atom aldehyde carbon, at temperatures of about 600–900° C. at ordinary atmospheric or elevated pressure, with a nickel containing catalyst.

BACKGROUND

The addition of carbon monoxide to olefinically unsaturated compounds, well known in the art by the name oxo-reaction or hydroformylation is of outstanding technical importance. The hydroformylation of most olefinically unsaturated compounds, insofar as such compounds are not symmetrical and incapable of isomerization of the olefinic double bond, always results in mixtures of several isomeric aldehydes (see J. Falbe, "Synthesen mit Kohlenmonoxyd," Springer-Verlag Berlin-Heidelberg-New York, 1967, page 7). For instance, when propylene is subjected to the reaction, a mixture of n- and isobutyraldehyde in a molar proportion of about 3:1 is obtained. While n-butyraldehyde represents a valuable starting material for numerous technical processes, it has hitherto not been possible, to economically use the isobutyraldehyde.

It is therefore an object of the invention to provide a process for the conversion of isobutyraldehyde to compounds, which can be technically utilized with economic advantage. As especially promising in this event appeared the catalytic splitting of isobutyraldehyde under oxidizing conditions to a mixture of hydrogen and carbon monoxide, which, e.g. after addition of an olefin, can again be used in the oxo synthesis.

From the literature it is known, to split aliphatic aldehydes by thermal treatment to thereby form lower molecular products. According to work carried out by S. K. Ho, Roy. Soc., A. 276 (1963), pages 278–292, products predominating in propane and carbon monoxide in addition to small proportions of propylene, which, as well as other olefins checks the splitting process, and hydrogen are obtained.

Furthermore, the catalytic splitting of isobutyraldehyde with formation of propylene has been described (see H. J. Hagemeyer, G. C. De Groes, The Chemistry of Isobutyraldehyde, Tennessee Eastman Company 1954, page 55). Hereby, palladium or copper can be used as catalysts. This process has the essential drawbacks, that further hydrogenation of the propylene to less valuable propane cannot be eliminated and that the catalysts lose their activity even after short reaction time.

According to British patent specification 916,216, hydrocarbons of a distinct boiling range, which are essentially free from olefinic and acetylenic unsaturated compounds can be converted with water vapor in the presence of a nickel catalyst to hydrogen and carbon oxides. The said process involves oxygen free compounds, which, owing to their structure, are chemically rather stable and therefore do not enter into side reactions.

THE INVENTION

It has now been found, that the catalytic splitting of isobutyraldehyde with formation of a gas mixture, consisting essentially of carbon monoxide and hydrogen can be effected with good results if isobutyraldehyde is reacted at temperatures of from 600 to 900° C. at ordinary or elevated pressure in the presence of at least 3 moles of water vapor per g-atom aldehydecarbon, if desired with addition of hydrogen or hydrogen containing gases at nickel containing catalysts.

It must be considered as highly surprising, that with the process of the invention, isobutyraldehyde can be very selectively converted to a gas mixture consisting essentially of carbon monoxide and hydrogen. It is hereby to be appreciated that, in spite of the high reactivity of the aldehyde under the reaction conditions selected as hereinbefore defined no side products are formed, which might noxiously influence the catalyst.

The presence of water vapor is a decisive presupposition for the success of the splitting of isobutyraldehyde in the claimed temperature range of from 600 to 900° C. Hereby, the deposition of carbon on the catalyst surface is prevented and a constant catalyst activity even over long periods assured, so that the process can be carried out continuously. It has been observed, that with use of at least 3 moles of water vapor per gram-atom aldehyde carbon, the carbon deposition is completely prevented. On working at the lower limit of the amount of water vapor related to the isobutyraldehyde charged, carbon monoxide rich gases are obtained, which, for instance, can be used in oxo-synthesis processes. If the addition of water vapor is increased, a gas with increased hydrogen content is obtained as reaction product. In a particular advantageous embodiment of the invention, the conversion of isobutyraldehyde is carried out in the presence of 3 to 4 moles of water vapor per g-atom aldehyde carbon.

A temperature range of from 700 to 800° C. proved to be especially well suited for the conversion of isobutyraldehyde into carbon monoxide and hydrogen.

According to the process of the invention, the conversion of isobutyraldehyde can be carried out at ordinary as well as at elevated pressure. Especially favorable results are obtained in a pressure range of from 15 to 25 atm. gauge. However, it has to be appreciated, that at increased pressure the amount of saturated hydrocarbons, especially methane, in the product gas increases compared with the working at ordinary atmospheric pressure. While with splitting at ordinary pressure the resulting carbon monoxide hydrogen mixture contains utmost 1% satruated hydrocarbons, its content in hydrocarbons can increase up to 3%, when the reaction is affected under increased pressure, so that a secondary splitting may be required.

The spatial velocity, with which the isobutyraldehyde is led over the stationary catalyst bed can be varied between wide limits. Independent of the pressure applied, spatial velocities of from 50 to 200 v./v.h. proved useful.

It is however also possible to significantly increase the spatial velocity, for instance up to 1000 v./v.h., without decrease of the conversion.

The apparatus suitable for use in the process of the invention is very simple. The splitting can for instance be carried out in a conventional tube reactor, in which the catalyst is arranged. Advantageously, the isobutyraldehyde is heated together with the steam at a temperature of between 500 and 650° C. in a pre-heater, in order to attain uniform temperature conditions. Hereby of course, splitting of the isobutyraldehyde to propylene, carbon monoxide and hydrogen may occur. In order to prevent the unsaturated hydrocarbon from polymerizing and the impairing the proceeding of the reaction by carbon deposition, especially on the catalyst, hydrogen or hydrogen containing gases, as for instance recirculated product gas, are added to the starting materials, in a preferred embodiment of the invention, in order to attain hydrogenation of the olefins. Hydrogen ratios of 40 to 80 normal liters per kg. isobutyraldehyde are suited.

According to the invention, the splitting of isobutyraldehyde is carried out in the presence of nickel catalysts stable against water vapor. Catalysts containing 5 to 25% by weight nickel besides conventional carrier materials as for instance alumina, magnesia and if desired activators and bonding agents, as for instance cement, are especially well suited. Outstanding results are obtained with catalysts containing 5 to 20% nickel. The nickel can be in metallic form or as a compound, e.g. the oxide, or a mixture of metallic nickel and a nickel compound.

Isobutyraldehyde of any origin can be used as starting material. It is however to be appreciated, that only sulfur free isobutyraldehyde, as obtained for instance at the hydroformylation of propylene, can be directly converted to carbon monoxide and hydrogen. Isobutyraldehyde contaminated with sulfur must be desulfurized preceding the splitting operation.

EXAMPLE 1

48 g. isobutyraldehyde and 192 g. water per hour (corresponding to 4 moles water per g-atom aldehyde carbon) were jointly vaporized in a preheater and heated together with 2.5 l. hydrogen per hour to a temperature of between 560 to 570° C. The resulting mixture was led at ordinary pressures from above downwards through a vertically arranged stainless steel tube (length 540 mm. diameter 32 mm.), containing the catalyst. The catalyst had a grain size of between 6 to 10 mm., its composition, when formulated, was as follows (in weight percent):

| | Percent |
|---|---|
| Nickel | 18.5 |
| Magnesium | 8.3 |
| Aluminum | 16.8 |
| $SiO_2$ | 16.5 | remainder iron oxide, calcium oxide and alkali-metal carbonates and alakli metal oxides.

The magnesium is in the form of magnesium oxide, the catalyst being 13.8% magnesium oxide; the aluminum is also present as the oxide, the catalyst being 31.9% aluminum oxide. The percentage for nickel is for metallic nickel.

The height of the catalyst charge was chosen in such manner, that the isobutyraldehyde-water vapor mixture encountered the catalyst with a temperature of 630° C. (the mixture was heated from about 570 to 630° C. in the portion of the reactor to be in advance of the catalyst bed), while the highest temperature in the interior of the catalyst bed and the exit temperature of the reaction product amounted to 800 to 810° C. Such temperature distribution was obtained with a catalyst charge of 230 ml.

The splitting products and excess water vapor are subsequently cooled in an intensively cooling device to 0 to 2° C. to separate out the water. Since the isobutyraldehyde splitting was complete, the separated water contained substantially no organic constituents. During an operation period of 1000 hours no decrease in catalyst activity and no carbon black formation was observed. From a charge of 1 kg. isobutyraldehyde an average yield of 2.8 Nm.$^3$ hydrogen, 0.57 Nm.$^3$ CO, 0.66 Nm.$^3$ $CO_2$ and 0.018 Nm.$^3$ methane was obtained.

EXAMPLE 2

The splitting of isobutyraldehyde was effected as described in Example 1, with the exception, that the gas mixture was contacted with the catalyst at a temperature of 470° C., so that the highest temperature reached in the catalyst bed amounted to 550° C. (below the temperature range of the invention). After an operation period of 10 hours a considerable carbon deposition on the catalyst was observed. The product gas had the following composition in volume percent:

| | Percent |
|---|---|
| Hydrogen | 67.2 |
| CO | 7.1 |
| $CO_2$ | 22.0 |
| Methane | 3.75 |

EXAMPLE 3

The test was operated with the use of a catalyst of the composition as described in Example 1. 176 g. isobutyraldehyde and 790 to 800 g. water per hour (corresponding to 4.5 moles water per g-atom aldehyde carbon) were jointly vaporized at a pressure of 18 atm. gauge and heated to a temperature of 430 to 450° C. The gas mixture was lead from the bottom toward the top through a tube reactor manufactured of high temperature stable steel having a length of 1600 mm. and an inner diameter of 30 mm. after having previously passed an independently heated preheating zone, so that the gas mivture encountered the catalyst with a temperature of at least 600° C. The highest temperature in the catalyst bed and the exit temperature of the product gas amounted to 800 to 805° C. The resulting splitting products were further processed as described in Example 1.

With a catalyst load of 342 g. isobutyraldehyde/kg. catalyst hour were obtained from 1 kg. isobutyraldehyde: 2.69 Nm.$^3$ $H_2$, 0.374 Nm.$^3$ CO, 0.80 Nm.$^3$ $CO_2$ and 0.75 Nm.$^3$ $CH_4$.

This example describes the process under pressure and in the absence of hydrogen; and shows that when using pressure isobutyraldehyde can be split, whereby a gas is formed which contains essentially hydrogen and carbon monoxide. This reaction procedure can be important in view of the post-treatment of the obtained split gas.

What is claimed is:

1. Process for catalytically splitting isobutyraldehyde with formation of a gas mixture consisting essentially of carbon monoxide and hydrogen which comprises contacting isobutyraldehyde and water vapor in amount of at least 3 moles water vapor per g-atom aldehyde carbon, at temperatures of about 600–900° C. at ordinary atmospheric or elevated pressure, with a nickel containing catalyst.

2. Process according to claim 1, said isobutyraldehyde and water vapor being admixed with hydrogen.

3. Process according to claim 2, wherein hydrogen is present in amount of about 40 to 80 normal liters of hydrogen to one kg. isobutyraldehyde respectively.

4. Process according to claim 1, which comprises effecting the contacting in the presence of about 3 to 4 moles water vapor per g-atom aldehyde carbon.

5. Process according to claim 1, which comprises effecting the contacting at temperatures of about 700–800° C.

6. Process according to claim 1, which comprises effecting the contacting at pressures of about 15–25 atm. gauge.

7. Process according to claim 1, which comprises using nickel catalyst containing about 5 to 25% by weight nickel.

8. Process according to claim 2, which comprises effecting the contacting in the presence of about 3 to 4 moles water vapor per g-atom aldehyde carbon.

9. Process according to claim 2, which comprises effecting the contacting at temperatures of about 700–800° C.

10. Process according to claim 3, which comprises effecting the contacting at pressures of about 15–25 atm. gauge.

11. Process according to claim 5, which comprises using nickel catalyst containing about 5 to 25% by weight nickel.

References Cited

UNITED STATES PATENTS 3,408,171  10/1968  Pupko _____ 48—214
3,451,949  6/1969   Topsoe et al. _____ 48—214X MORRIS O. WOLK, Primary Examiner R. E. Serwin, Assistant Examiner U.S. Cl. X.R.

48—211, 213, 214; 252—373, 466

UNITED STATES PATENT OFFICE
CERTIFICATE OF CORRECTION

Patent No. 3,578,423          Dated May 11, 1971

Inventor(s) Jurgen Falbe, et al.

It is certified that error appears in the above-identified patent and that said Letters Patent are hereby corrected as shown below:

Col. 3, line 45, change "pressures" to --pressure--.

Col. 4, line 42, change "0.75" to --0.075--.

Signed and sealed this 4th day of January 1972.

(SEAL)
Attest:

EDWARD M. FLETCHER, JR.          ROBERT GOTTSCHALK
Attesting Officer                Acting Commissioner of Patents